Figure 1:
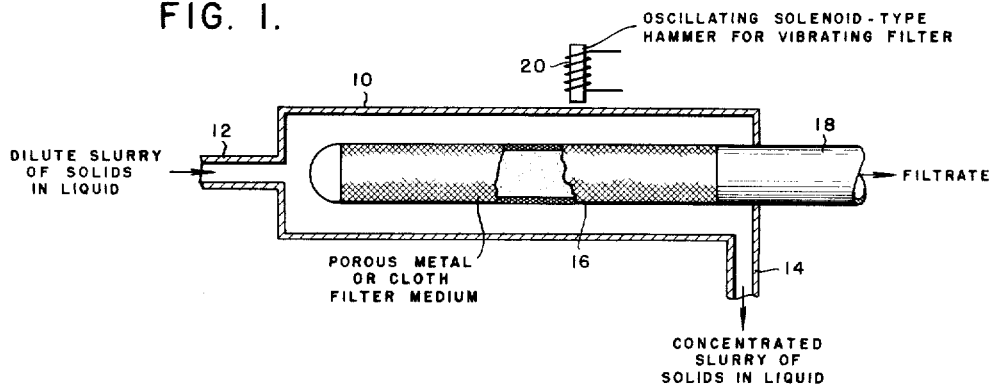

Oct. 3, 1961 — T. H. ROYDER — 3,002,915
FILTRATION METHOD
Filed Aug. 18, 1958

INVENTOR.
THOMAS H. ROYDER,
BY Carl G. Ries
ATTORNEY.

3,002,915
FILTRATION METHOD
Thomas H. Royder, Baytown, Tex., assignor, by mesne assignments, to Esso Research and Engineering Company, Elizabeth, N.J., a corporation of Delaware
Filed Aug. 18, 1958, Ser. No. 755,687
1 Claim. (Cl. 208—38)

This invention relates to a method for the solvent dewaxing of petroleum hydrocarbon lubricating oil fractions. More particularly, this invention relates to an improved filtration-type method for the removal of crystallized wax from a solvent solution of a dewaxed petroleum hydrocarbon lubricating oil fraction wherein an enhanced rate of recovery of dewaxed oil is obtained.

Paraffinic petroleum hydrocarbon fractions which are suitable for base materials in the compounding of motor oils will normally contain a significant amount of wax which must be removed if a satisfactory motor oil is to be obtained. The wax is normally removed from such feed stocks in a continuous process by fractional crystallization of the wax from a solution of the feed stock in a dewaxing solvent.

In copending Moore and Royder application Ser. No. 643,096, filed February 28, 1957, now U.S. Patent No. 2,914,456 and entitled "Dewaxing of Oils," there is disclosed an improved method for the removal of crystallized wax from a solvent solution of oil wherein a slurry of wax crystals in the said solution is passed through a turbulent isothermal filtration zone in order to remove a selected amount of the mother liquor such that an amount of mother liquor remains associated with the wax crystals sufficient to provide a flowable slurry.

While filtration techniques of this nature have given reasonably satisfactory results, there has been need for improvement. Thus, one of the limiting factors is the rate at which blinding of the filter medium occurs. Blinding, the resistance to flow through a filter medium, can be considered in terms of the pressure drop existing across the filter medium. Thus, in an operation in which filtrate is withdrawn at a constant rate, a clean filter medium such as a filter cloth will have a minimized pressure drop which will increase as the cloth blinds and soon after the maximum possible pressure drop has been reached, filtrate can no longer be removed at the previously established rate. In the case where a desired pressure drop is initially established across a filter medium and maintained constant throughout the operation, blinding rate is indicated by the rate at which the initial flow of filtrate diminishes. In a constant pressure drop operation, blinding occurs at a faster rate than in a constant filtrate rate filtration. For this reason, unless the solid particles being handled are relatively large, incompressible and of uniform size, a constant rate filtration will give higher production. From the foregoing, it is seen that for maximum utilization of a given filter area it is desirable to provide a turbulent isothermal filtration method wherein the rate of increase in pressure drop across the filter medium is minimized.

This is accomplished in accordance with the present invention by charging a slurry of crystallized wax in a mother liquor consisting of a dewaxing solvent and a dewaxed oil through a turbulent isothermal filtration zone at a desired flow rate and separating at least a portion of the mother liquor from the slurry by turbulent isothermal filtration at a desired filtration rate while periodically transmitting compression-type shock waves through the slurry.

Figure 2:
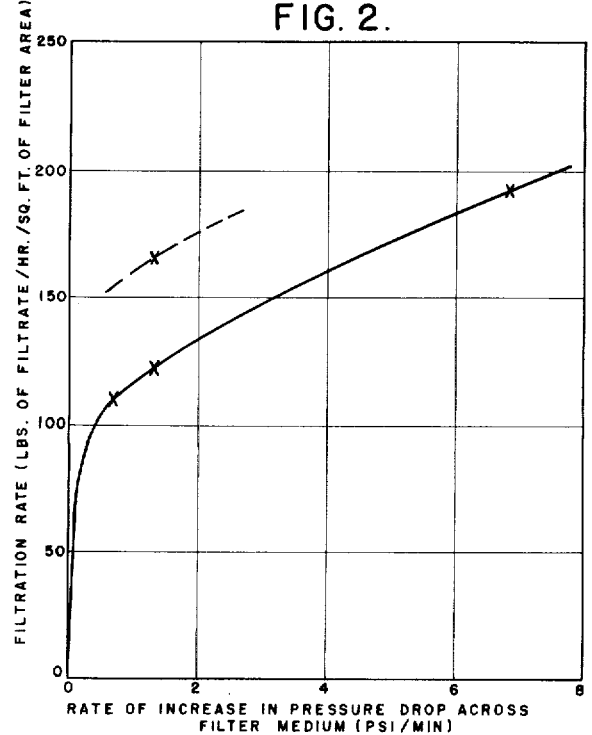

The invention will be further illustrated with respect to the accompanying drawings wherein:

FIG. 1 is a schematic elevational view, partly in section, showing one mode of practicing the process of the present invention; and FIG. 2 is a graph illustrating the improvement in filtration rate obtainable in accordance with the present invention.

Turning now to FIG. 1, there is schematically disclosed a housing 10 provided with an inlet line 12 and a discharge line 14. Arranged within the housing 10 is a suitable filter element such as a porous micrometallic filter, a filter cloth supported on a suitable perforate support, etc. which might consist of a concentric arrangement of such elements. In the drawing, the filter element is designated generally by the numeral 16. The interior of the filter element 16 is fluidly interconnected with a filtrate withdrawal line 18.

In conducting filtration operations with a device of the type schematically shown in FIG. 1, a dilute slurry of wax crystals in a mother liquor consisting of a solution of dewaxed oil in solvent is charged to the housing 10 by way of the line 12 and flowed through the annulus between the housing 10 and the filter element 16 at a sufficiently high velocity to insure highly turbulent flow. At the same time, a pressure differential is created across the surface of the filter element 16 in any suitable manner, such as by actuation of a pump (not shown) in the filtrate withdrawal line 18. The rate of filtrate flow may or may not be regulated. As a consequence, a portion of the mother liquor will be drawn through the filter element 16 for discharge through the filtrate line 18 while a progressively more concentrated slurry of wax crystals in mother liquor flows through the annulus and out the discharge line 14.

The majority of the crystals in the slurry charged to the annulus will pass therethrough and out the discharge line 14 without being trapped on the filter element 16. However, a small but significant number of crystals, particularly those of less than average size, will be trapped on or within the filter medium whereby the filter element 16 will become more and more blinded as filtration operations proceed.

At a given filter rate, the blinding rate varies inversely with respect to velocity (i.e., bears an inverse relationship with respect to velocity) and at a given velocity at the rate of blinding depends on the rate of filtrate withdrawal. As indicated, when the degree of blinding becomes excessive as demonstrated, for example, by a reduction of the rate at which filtrate can be forced through the filter medium 16, filtration operations must be suspended and the filter medium must be treated with hot solvent or other suitable materials in order to remove the blinding substances and restore the filtration efficiency of the element 16.

In accordance with the present invention, substantially increased filtration rates are obtained without increasing the rate of blinding, contrary to accepted practice, through the provision of a suitable device 20 such as an oscillating solenoid-type hammer to at least periodically subject the filter element to compressional-type shock waves. This may be accomplished, as indicated, by the simple expedient of actuation of the hammer element 20 whereby the housing 10 or filtrate piping 18 is struck with a force sufficient to impart compression-type pressure waves to the filter element 16 as slurry turbulently flows through the annulus between the filter element 16 and the housing 10.

Preferably, the jarring is of a vibratory type and the vibratory-type jarring step is conducted intermittently at predetermined intervals.

Thus, for example, the element 20 may be actuated at periods ranging from about 10 to 60 minutes in order to provide for periodic vibration of the housing 10. Each period of vibration preferably lasts from about 10 to 60 seconds.

When wax filtration operations are conducted in the just-described manner, there is a material increase in the rate at which filtrate may be withdrawn without increasing the rate of blinding of the filter cloth; or the original filtrate withdrawal rate could be maintained for a longer period before hot wash.

This is demonstrated by the following example which is given by way of illustration and not as a limitation on the scope of this invention. Results in each case depend on such factors as characteristics of the feed stock, type of filtering medium, and annular velocity of slurry compressibility and size distribution of wax crystals, filtrate viscosity (temperature and dilution ratio).

EXAMPLE I

In order to obtain a measurement of the rate of blinding of a filter medium, a feed stock of standardized composition was subjected to turbulent isothermal filtration in a device of the type shown schematically in FIG. 1. The feed stock was a paraffinic lubricating oil fraction having a 10 mm. ASTM distillation range of about 430° to 760° F., such feed stock having a gravity of 27.6° API, a viscosity (210°) of 69.0 SSU, a pour point ° F. of about 115, and a wax content of about 25 weight percent. For each dewaxing operation the desired amount of feed stock was mixed with a solvent consisting of a mixture of about 65 percent of methylethylketone with about 35 percent of toluene and chilled to a temperature of −7° F. in order to precipitate crystals of wax and to provide a slurry of wax crystals in a mother liquor consisting of the solvent and dewaxed oil.

The thus-formed slurry was then subjected to filtration operations in a turbulent isothermal filtration-type unit of the type shown in FIG. 1. The results obtained are graphically displayed in FIG. 2 by the solid line.

It will be noted, for example, that at a filtration rate of about 100 pounds of filtrate per hour per square foot of filtered area, the rate of increase in pressure drop across the filter medium (nylon cloth) was about 0.15 p.s.i. per minute. When the filter rate was increased 25 percent to about 125 pounds of filtrate per hour per square foot of filter area, the rate of blinding increased tremendously whereby the rate of increase in pressure drop across the filter medium was about 1.3 p.s.i. per minute.

On conducting filtration operations as described in the present invention, there is obtained a substantially improved filtration rate for a given rate of increase in pressure drop. This is shown, for example, by the results set forth in Table I for two comparative runs, as graphically plotted in FIG. 2.

Table 1

| | Normal | With Vibration |
|---|---|---|
| Run Number | 55(2) | 55(4)* |
| Filter Surface Area, Square Feet | 1.23 | 1.23 |
| Annulus Area, Square Feet | 0.0413 | 0.0413 |
| Filter Temperature, ° F | −7 | −7 |
| Filtrate: | | |
| Density at Filter Temp., Lb./Ft | 54.17 | 54.17 |
| Vis. at Filter Temp., (Lb./Ft./Sec.) × 10 | 1.026 | 1.026 |
| Volume Percent Oil (±4% Oil) | 12.0 | 12.0 |
| Dewaxed Oil Pour, ° F | 20 | 20 |
| Filtrate Withdrawal Rate, Lbs./Hr./Ft | 123.9 | 163.0 |
| Slurry: | | |
| Flow, g.p.m | 91.48 | 91.81 |
| Reynold's Number in Annulus | 11,411 | 11,434 |
| Superficial Annulus Velocity, Ft./Sec | 4.94 | 4.95 |
| Increase in Pressure Drop Across Medium (ΔP), p.s.i | 11.3 | 11.3 |
| Time (T), Minutes | 9.0 | 9.0 |
| ΔP/T | 1.26 | 1.26 |

*Filter was vibrated during this run.

As will be observed by the dotted line in FIG. 2, periodic vibration of the filter element resulted in a very material increase in filter rate. Note that the blinding rate at a given rate of filtrate withdrawal is materially reduced through the provision of the process of the present invention.

Note also that it was possible through the practice of the process of the present invention to obtain materially increased filtration rate of about 175 pounds of filtrate per hour per square foot of filter area with a pressure drop rate increase of about 1.3 p.s.i. per minute. As shown by the solid line of FIG. 2, it would normally be expected that this rate of filtration increase could only be obtained at the substantial and material rate of increase of pressure drop of about 4.1 p.s.i. per minute.

Having described my invention, what is claimed is:

In a continuous method for the turbulent isothermal filtration of a slurry of crystallized wax in a mother liquor consisting of a solution of dewaxed lubricating oil in a dewaxing solvent, the improved method of filtration which consists essentially of continually, turbulently, isothermally flowing said slurry past a filtering element in a filtration zone defined by a housing to thereby permit the filtering of a selected portion of said mother liquor through said filter element, continuously maintaining a slurry flow velocity sufficient to sweep wax crystals past said filter element to keep said filter element clean and during the time said slurry is maintained in continuous flow, periodically subjecting the said filtering element to compression-type shock waves at intervals of time within the range of 10 to 60 minutes by positive mechanical vibration while maintaining the slurry flow at undiminished velocity, each period of vibration being conducted for a period of time within the range of from about 10 to 60 seconds whereby fine wax particles which would normally tend to blind said filtering element are at least partially dislodged therefrom into said flowing stream of slurry.

References Cited in the file of this patent

UNITED STATES PATENTS

| | | |
|---|---|---|
| 1,709,286 | Spaulding | Apr. 16, 1929 |
| 1,979,991 | Newton et al. | Nov. 6, 1934 |
| 2,083,578 | Roberts | June 15, 1937 |
| 2,720,315 | Peterson | Oct. 11, 1955 |
| 2,730,242 | Samuel | Jan. 10, 1956 |
| 2,788,859 | Eron | Apr. 16, 1957 |
| 2,820,070 | Bennett et al. | Jan. 14, 1958 |
| 2,874,848 | Cannon et al. | Feb. 24, 1959 |
| 2,914,456 | Moore et al. | Nov. 24, 1959 |